F. D. BAKER.
INDICATING MECHANISM FOR JIGS OR CLASSIFIERS.
APPLICATION FILED DEC. 5, 1908.
1,011,307.
Patented Dec. 12, 1911.
3 SHEETS—SHEET 1.
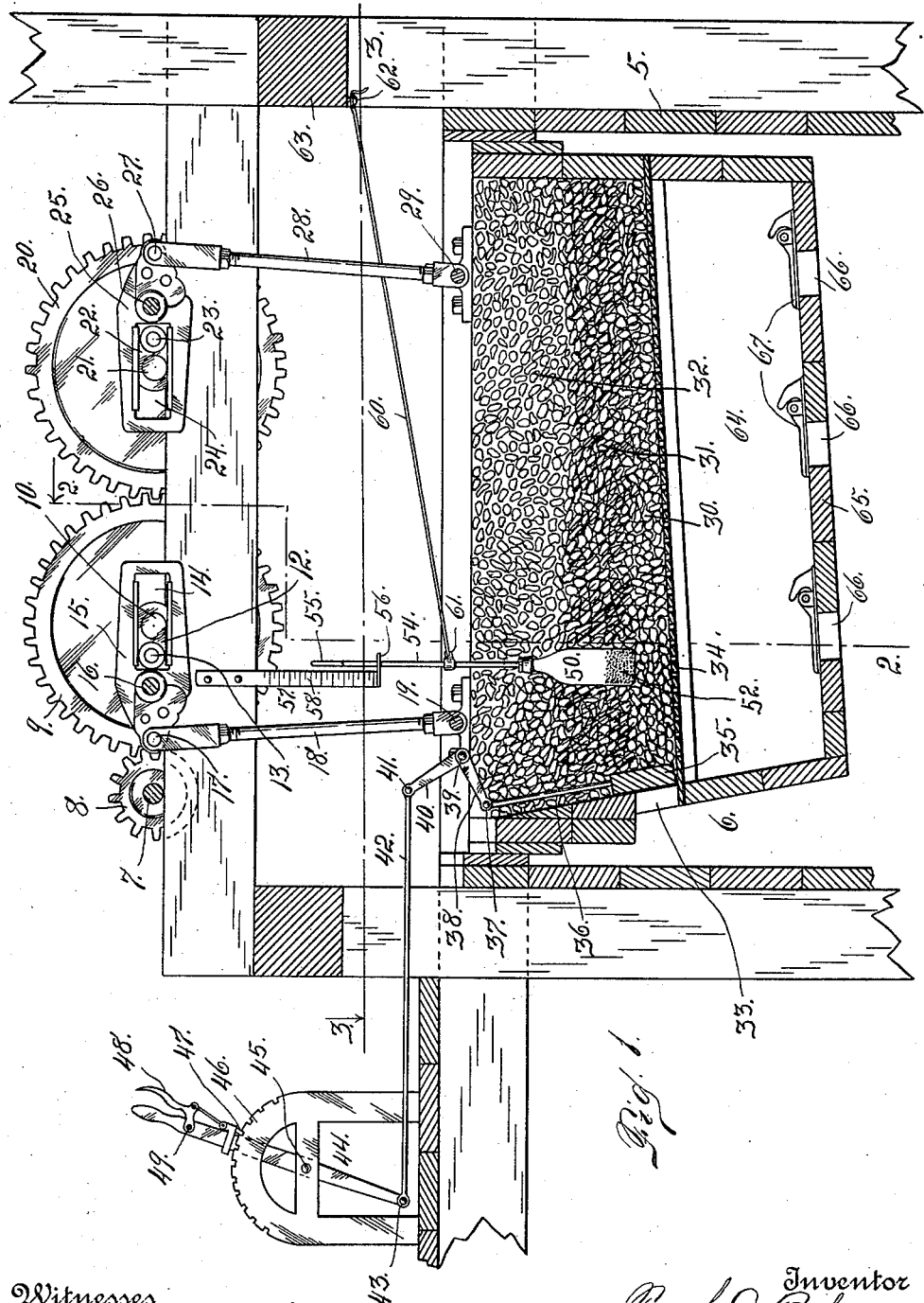

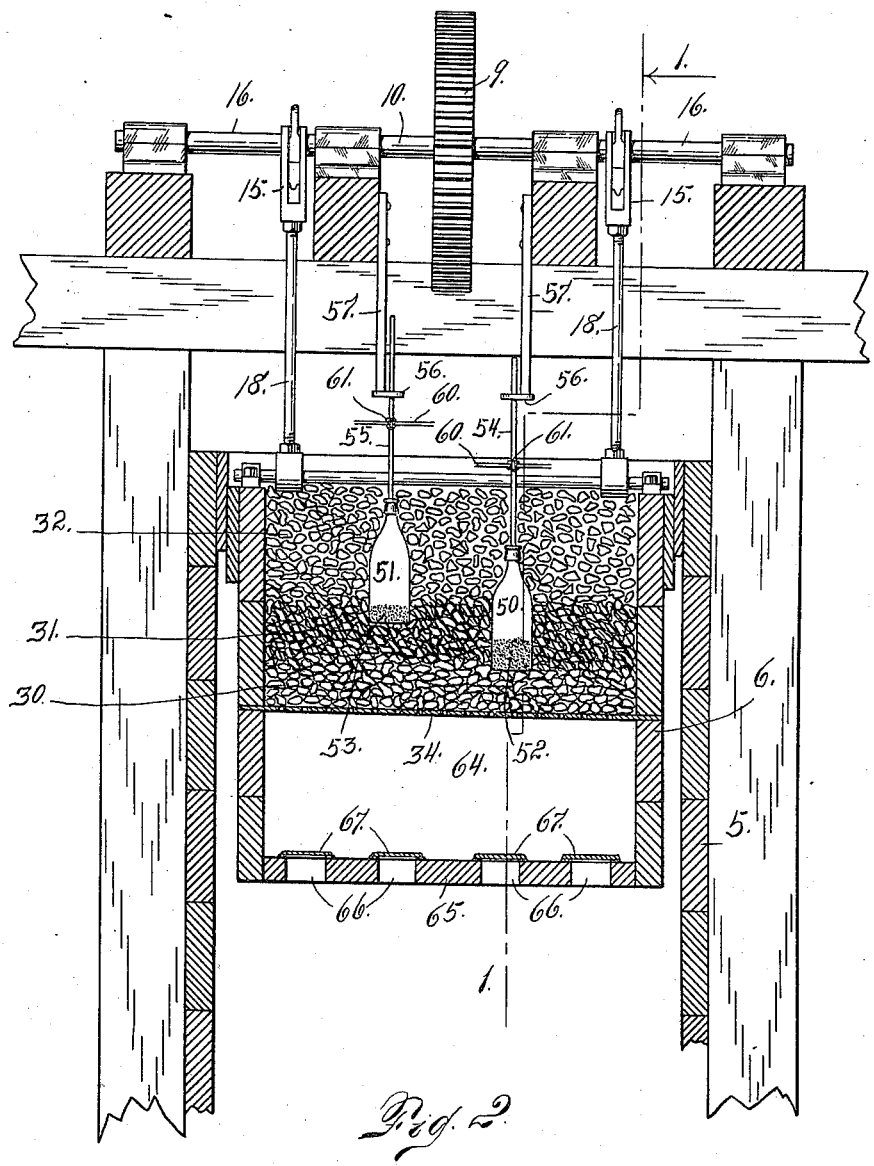

F. D. BAKER.
INDICATING MECHANISM FOR JIGS OR CLASSIFIERS.
APPLICATION FILED DEC. 5, 1908.
1,011,307.
Patented Dec. 12, 1911.
3 SHEETS—SHEET 3.
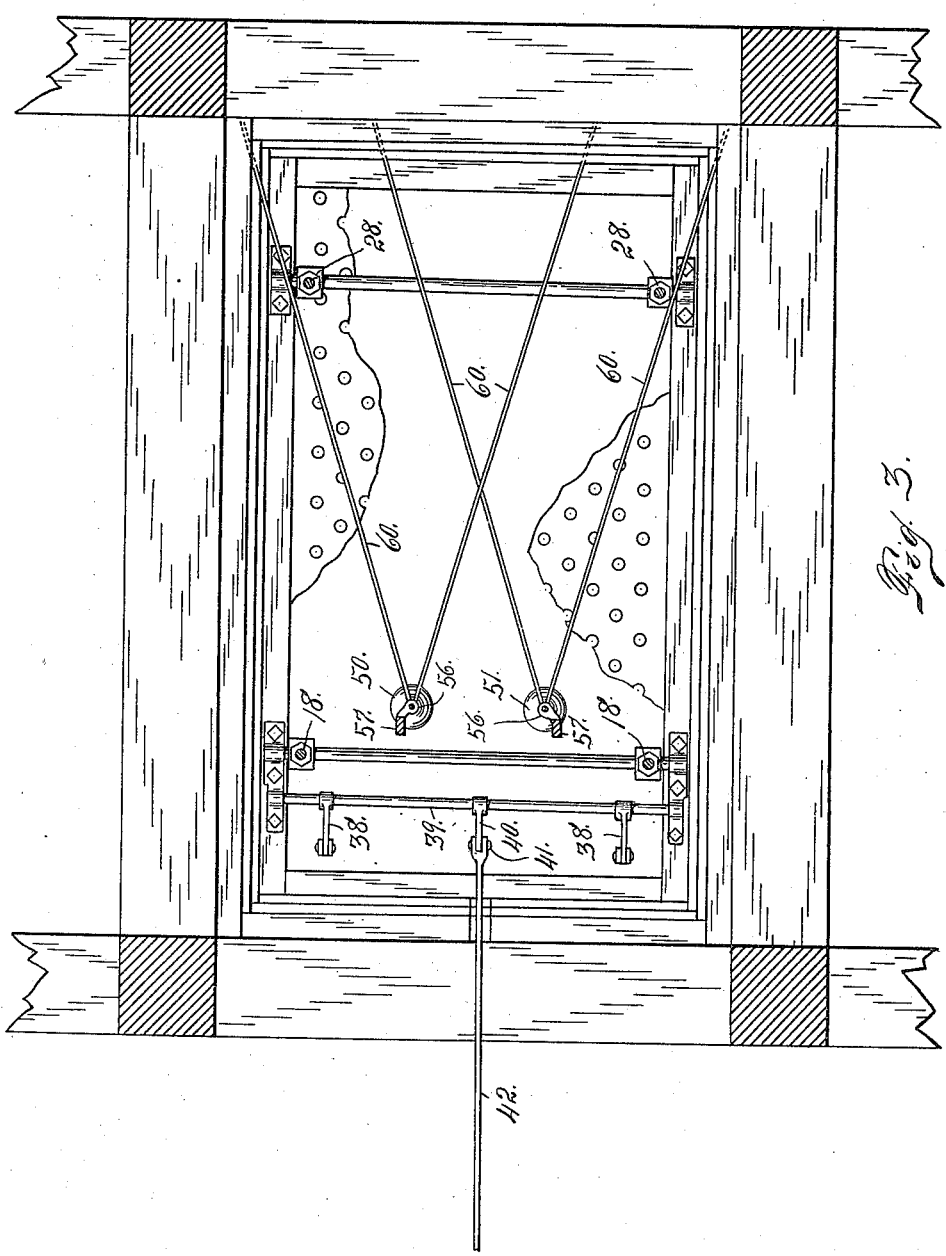

UNITED STATES PATENT OFFICE.

FRANK D. BAKER, OF DENVER, COLORADO.

INDICATING MECHANISM FOR JIGS OR CLASSIFIERS.

1,011,307.  Specification of Letters Patent.  Patented Dec. 12, 1911.

Application filed December 5, 1908. Serial No. 466,184.

*To all whom it may concern:*

Be it known that I, FRANK D. BAKER, a citizen of the United States, residing in the city and county of Denver and State of Colorado, have invented certain new and useful Improvements in Indicating Mechanism for Jigs or Classifiers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in apparatus for washing coal and other materials, said apparatus including a vertically reciprocating jig having a differential movement whereby the downward stroke is relatively rapid, the bottom of the jig being open to the passage of water. Under the influence of this movement the material is stratified according to its specific gravity. If coal is under treatment the heavier material, as rock or slate, assumes the lowermost stratum while the coal occupies a position above and gradually escapes at the top of the jig. The rock, slate or heavier material which it is desired to separate from the coal, gradually increases in depth in the bottom of the jig and must be removed therefrom through an opening which is normally closed by a suitable gate.

The object of my present invention is to provide indicating means whereby the depth of the rock above the bottom of the jig may be indicated, whereby the person in charge of the apparatus is informed, without special investigation. that the gate controlling the rock-escape-opening should be opened.

My improved indicating mechanism may be of any suitable construction; but as herein shown and described, I employ a suitable receptacle, as a bottle, in which is placed a suitable quantity of shot or other material, whereby the bottle is sufficiently weighted to cause it to assume a position on top of the rock or heavier material of the mass to be separated. Connected with this bottle and projecting upwardly above the top of the jig is a rod passing through a guide and occupying a position adjacent a stationary graduated bar. The position of this rod taken in connection with the graduated part, indicates the depth of the rock or other material. When it is desired to indicate the depth of various strata of different specific gravity a number of indicating devices are employed. The bottles which are used to indicate the depth of strata of less specific gravity, will be lighter and consequently contain less of the material, as shot, employed for weighting purposes. As shown in the drawing, two bottles are employed to indicate the depth of different strata.

For the purpose of this specification, it may be assumed that the lower bottle indicates the depth of the rock above the bottom of the jig, while the upper bottle indicates the distance from the top of the middlings quality of coal to the bottom of the jig. Furthermore, by comparing the upper extremities of the rods connected with the two bottles, the depth of the upper stratum of material will also be indicated since it may be assumed that the indicating rods are both of the same length. Hence the distance of the top of one rod above the top of the other rod will indicate the depth of the stratum of material immediately above the stratum next below.

It will, of course, be understood that my improved indicating apparatus may be employed to designate the depth of the various strata of any material which is capable of being separated or stratified according to its specific gravity.

As heretofore intimated it will be understood that devices other than bottles may be employed for indicating purposes, though these receptacles answer every purpose since they are cheap and their walls being transparent, make it practicable to readily observe the depth of the quantity of shot or other weighting material employed.

Having briefly outlined my improved construction, I will proceed to describe the same in detail, reference being made to the accompanying drawing in which is illustrated an embodiment thereof.

In this drawing, Figure 1 is a vertical section taken through a coal-washing jig equipped with my improvements. This section may be said to be taken on the line, or approximately on the line 1—1 Fig. 2. Fig. 2 is a section taken at right angles to Fig. 1 and is indicated by the line 2—2 Fig. 1. Fig. 3 is a horizontal section taken on the line 3—3 Fig. 1, looking downwardly.

The same reference characters indicate the same parts in all the views.

Let the numeral 5 designate a suitable tank adapted to contain liquid and in which a jig 6 is mounted to reciprocate vertically through the instrumentality of suitable operating mechanism adapted to impart a relatively rapid downward movement or stroke, whereby the material contained in the jig is suspended to a greater or less degree according to its specific gravity. The lightest material or that having the least specific gravity will naturally be buoyed up by the water to the greatest extent or degree and consequently caused to assume the uppermost position in the jig. In this manner the material under treatment, whether coal, ore or other substance, is stratified.

As shown in the drawing the reciprocating movement is imparted to the jig from an operating shaft 7 having a gear 8 fast thereon and meshing with a gear 9 fast on a second shaft 10, having a crank 12 carrying a crank pin 13 engaging a slot 14 formed in a lever 15 fulcrumed at 16 and whose short arm is pivotally connected as shown at 17 with a pitman 18 whose lower extremity is connected as shown at 19 with the jig. The gear 9 meshes with a similar gear 20 fast on a shaft 21 having a crank 22 provided with a pin 23 passing through a slot 24 formed in a lever 25 fulcrumed at 26, the short arm of the lever being connected as shown at 27 with a pitman 28 connected with the jig as shown at 29. Through the medium of this operating mechanism a suitable reciprocating movement is imparted to the jig of the character heretofore indicated. However, as nothing is claimed in this application upon this operating mechanism its operation need not be further described in detail. It may be stated, however, that the said operating mechanism is minutely explained in Patent to Robert L. Martin, Jr., No. 816,672, dated April 3rd, 1906.

It may be assumed that under the influence of the vertically reciprocating movement imparted to the jig by the aforesaid operating mechanism, the contents of the jig have been arranged in three distinct strata designated 30, 31 and 32, the stratum designated 30 being lowermost, that designated 31 being next above, and that designated 32 being uppermost. Assuming that coal is under treatment the grade 30 will be rock or slate, constituting the worthless portion of the material; the stratum designated 31, the middlings or medium grade of coal; while the stratum designated 32 will be the best grade of coal. Since it is not desirable that the rock stratum shall be allowed to acquire such a depth in the jig as to cause it to mingle with the uppermost stratum, which passes over the top of the jig, it is exceedingly desirable that automatic means be provided for indicating the depth of rock in order that it may be drawn off through an opening 33 formed in the wall of the jig immediately above the perforated bottom 34. This opening 33 is controlled by a gate 35 to which is connected a rod 36 whose upper extremity is pivotally connected as shown at 37 to a crank arm 38 of a rock shaft 39. As shown in the drawing (see Fig. 3) two crank arms 38 are connected with the rock shaft for operating the gate. Centrally connected with this shaft is a third crank arm 40 to which is connected as shown at 41, one extremity of a rod 42 whose opposite extremity is connected as shown at 43 with a lever 44 fulcrumed at 45 and arranged to move in suitable proximity to a quadrant 46 the lever being equipped with a pawl 47 operated from a handle 48 pivotally connected with the lever as shown at 49 in the usual manner.

As shown in the drawing two bottles designated 50 and 51 respectively, are employed for indicating the depth of the strata 30 and 31 within the jig. The bottle 50 contains a mass of shot or other suitable weighting material 52 greater than the mass 53 of the same material contained in the bottle 51. It is evident that the greater the mass of weighting material contained in any bottle, the lower the position it will assume in the jig when the latter is subjected to the vertically reciprocating movement heretofore described. Hence in regulating the mass of weighting material in a bottle the person in charge must be guided by the character of the material whose depth is to be indicated thereby. Each of the bottles 50 and 51 is provided with upwardly projecting rods 54 and 55 respectively. These rods pass through guides 56 connected with the lower extremities of bars 57 which are graduated as shown at 58. It will be understood that as this rock accumulates the bottle will rise accordingly being carried upwardly by the rock, the mass of its weighting material being so regulated that the bottom of the bottle will at all times rest on top of the rock stratum.

In order to prevent the forward movement of the bottles as the material in the jig advances due to the jigging action of the jig, small cables 60 or other suitable flexible devices may be connected with each rod. As shown in the drawing and best illustrated in Fig. 3 two cables 60 are connected with each rod as shown at 61; the opposite extremities of each cable being connected as shown at 62 with a stationary beam 63 of the framework. As shown in the drawing two pitmen 28 and two pitmen 18 are employed in reciprocating the jig.

From the foregoing description the use of my improved indicating mechanism will be readily understood. Below the perforated bottom 34 of the jig, is a compartment 64 controlled by valves 67 which open upwardly to allow the water to enter the jig freely during the downward movement of the latter, while during its upward movement these valves close to prevent a downward current since a downward current in this class of work is not desirable.

In the use of the jig, when the rod 54 indicates that a predetermined depth of rock 30 has accumulated in the bottom of the jig, the gate 35 may be raised by operating the lever 44 which is connected with the gate through the medium of the rod 42 and the crank arms 38 and 40. As soon as the gate is raised the rock will begin to discharge through the openings 33 and the gate may be left open until the bottle 50 reaches the perforated bottom 34 as indicated by its rod. The gate may then be closed until it becomes necessary to open it again for a similar purpose.

Having thus described my invention what I claim is:—

In an apparatus of the class described, the combination with a jig for stratifying materials according to their specific gravity, of a device located in the jig and of suitable mass to maintain a predetermined position with reference to a certain grade of the material to be stratified, the said device having an upwardly projecting arm, a depending scale connected in alinement with the said arm, the said scale having a single guide at its lower extremity for the said arm, and a flexible cable passed around the arm and connected at its extremities with the rear end of the jig, the said cable holding the said device against forward movement under the action of the material in passing forwardly in the jig, substantially as described.

In testimony whereof I affix my signature in presence of two witnesses.

FRANK D. BAKER.

Witnesses:
W. C. KEENEY,
H. H. STEM.

---

Copies of this patent may be obtained for five cents each, by addressing the "Commissioner of Patents, Washington, D. C."